(12) United States Patent
Qu et al.

(10) Patent No.: US 12,340,792 B2
(45) Date of Patent: Jun. 24, 2025

(54) SYSTEMS AND METHODS FOR FEW-SHOT INTENT CLASSIFIER MODELS

(71) Applicant: Salesforce, Inc, San Francisco, CA (US)

(72) Inventors: Jin Qu, San Mateo, CA (US); Wenhao Liu, Redwood City, CA (US); Kazuma Hashimoto, Menlo Park, CA (US); Caiming Xiong, Menlo Park, CA (US)

(73) Assignee: Salesforce, Inc., San Francisco, CA (US)

( * ) Notice: Subject to any disclaimer, the term of this patent is extended or adjusted under 35 U.S.C. 154(b) by 509 days.

(21) Appl. No.: 17/534,008

(22) Filed: Nov. 23, 2021

(65) Prior Publication Data

US 2022/0366893 A1    Nov. 17, 2022

Related U.S. Application Data

(60) Provisional application No. 63/189,632, filed on May 17, 2021.

(51) Int. Cl.
   *G10L 15/06*   (2013.01)
   *G10L 15/16*   (2006.01)

(52) U.S. Cl.
   CPC ............ *G10L 15/063* (2013.01); *G10L 15/16* (2013.01); *G10L 2015/0636* (2013.01); *G10L 2015/0638* (2013.01)

(58) Field of Classification Search
   CPC .................. G10L 15/063; G10L 15/16; G10L 2015/0636; G10L 2015/0638
   USPC ........................................................ 704/244
   See application file for complete search history.

(56) References Cited

U.S. PATENT DOCUMENTS

| | | | |
|---|---|---|---|
| 8,015,006 B2 * | 9/2011 | Kennewick | G10L 15/22 707/723 |
| 10,147,428 B1 * | 12/2018 | Shastry | G10L 17/00 |
| 10,652,180 B1 * | 5/2020 | Schwartz | G06F 16/25 |
| 11,043,205 B1 * | 6/2021 | Su | G10L 15/183 |
| 11,081,104 B1 * | 8/2021 | Su | G06F 40/216 |
| 11,410,653 B1 * | 8/2022 | Mahar | G10L 15/183 |
| 11,488,256 B1 * | 11/2022 | Schaps | G06N 5/022 |
| 11,527,237 B1 * | 12/2022 | Sarikaya | G10L 15/16 |
| 11,580,968 B1 * | 2/2023 | Gupta | G10L 15/22 |
| 11,640,505 B2 * | 5/2023 | Gao | G06F 40/289 704/9 |
| 11,657,104 B2 * | 5/2023 | Altaf | G06F 40/20 704/244 |

(Continued)

*Primary Examiner* — Thuykhanh Le
(74) *Attorney, Agent, or Firm* — Haynes and Boone, LLP (57) ABSTRACT

Some embodiments of the current disclosure disclose methods and systems for training for training a natural language processing intent classification model to perform few-shot classification tasks. In some embodiments, a pair of an utterance and a first semantic label labeling the utterance may be generated and a neural network that is configured to perform natural language inference tasks may be utilized to determine the existence of an entailment relationship between the utterance and the semantic label. The semantic label may be predicted as the intent class of the utterance based on the entailment relationship and the pair may be used to train the natural language processing intent classification model to perform few-shot classification tasks.

20 Claims, 7 Drawing Sheets

(56) References Cited

U.S. PATENT DOCUMENTS

| | | | | |
|---|---|---|---|---|
| 11,769,491 B1* | 9/2023 | Bafna | | G10L 25/84 |
| | | | | 704/231 |
| 12,219,154 B2* | 2/2025 | Shastry | | G10L 17/00 |
| 2003/0200262 A1* | 10/2003 | Enomoto | | H04L 41/50 |
| | | | | 709/205 |
| 2012/0215477 A1* | 8/2012 | Tuck | | G01P 21/00 |
| | | | | 73/1.38 |
| 2016/0225370 A1* | 8/2016 | Kannan | | G10L 15/18 |
| 2017/0220668 A1* | 8/2017 | Patton | | H03F 1/3247 |
| 2017/0262269 A1* | 9/2017 | Onda | | G06F 8/61 |
| 2017/0351706 A1* | 12/2017 | Kong | | G06F 16/5838 |
| 2018/0232435 A1* | 8/2018 | Papangelis | | G06N 3/08 |
| 2018/0233143 A1* | 8/2018 | Papangelis | | G10L 15/16 |
| 2018/0358001 A1* | 12/2018 | Amid | | G06F 16/3329 |
| 2019/0066694 A1* | 2/2019 | Hirzel | | G10L 17/22 |
| 2019/0103095 A1* | 4/2019 | Singaraju | | G06F 16/35 |
| 2019/0156192 A1* | 5/2019 | Dasgupta | | G06V 10/764 |
| 2019/0385610 A1* | 12/2019 | Steelberg | | G10L 25/90 |
| 2020/0051549 A1* | 2/2020 | Chen | | G10L 15/063 |
| 2020/0066278 A1* | 2/2020 | Steelberg | | G06N 3/045 |
| 2020/0075019 A1* | 3/2020 | Steelberg | | G06F 40/284 |
| 2020/0241524 A1* | 7/2020 | Britto Mattos Lima | | |
| | | | | G06V 20/188 |
| 2020/0342032 A1* | 10/2020 | Subramaniam | | G06F 11/322 |
| 2020/0380382 A1* | 12/2020 | Seo | | H04L 51/046 |
| 2021/0035563 A1* | 2/2021 | Cartwright | | G06N 3/084 |
| 2021/0082424 A1* | 3/2021 | Johnson | | G10L 15/063 |
| 2021/0174252 A1* | 6/2021 | Jeong | | G10L 25/51 |
| 2021/0193118 A1* | 6/2021 | Lee | | G10L 15/063 |
| 2021/0256386 A1* | 8/2021 | Wieman | | G06N 3/044 |
| 2021/0264557 A1* | 8/2021 | Mao | | G06T 1/20 |
| 2021/0295833 A1* | 9/2021 | Rastrow | | G10L 15/1815 |
| 2021/0312906 A1* | 10/2021 | Kuo | | G10L 15/1822 |
| 2021/0365279 A1* | 11/2021 | Chirakkil | | G06N 7/01 |
| 2021/0390951 A1* | 12/2021 | Gadde | | G06F 40/30 |
| 2022/0044365 A1* | 2/2022 | Zhang | | G06T 3/40 |
| 2022/0058347 A1* | 2/2022 | Singaraju | | H04L 51/02 |
| 2022/0059077 A1* | 2/2022 | Thomson | | G10L 15/065 |
| 2022/0059094 A1* | 2/2022 | Thomson | | G10L 15/32 |
| 2022/0084510 A1* | 3/2022 | Peng | | G10L 15/063 |
| 2022/0093088 A1* | 3/2022 | Rangarajan Sridhar | | |
| | | | | G06F 16/338 |
| 2022/0101116 A1* | 3/2022 | Sheikholeslami | | G06N 5/01 |
| 2022/0139384 A1* | 5/2022 | Wu | | G06F 40/35 |
| | | | | 704/257 |
| 2022/0164547 A1* | 5/2022 | Tan | | G06F 40/58 |
| 2022/0171947 A1* | 6/2022 | Xu | | G06N 3/006 |
| 2022/0180858 A1* | 6/2022 | Aharoni | | G10L 15/063 |
| 2022/0198781 A1* | 6/2022 | Monka | | G06V 10/764 |
| 2022/0207305 A1* | 6/2022 | Mosayyebpour Kaskari | | |
| | | | | G06F 18/256 |
| 2022/0222435 A1* | 7/2022 | Lin | | G06F 40/30 |
| 2022/0230000 A1* | 7/2022 | Jalaluddin | | G06F 40/295 |
| 2022/0237378 A1* | 7/2022 | El Asri | | G06F 40/284 |
| 2022/0245353 A1* | 8/2022 | Turkkan | | G06F 40/216 |
| 2022/0269938 A1* | 8/2022 | Linck | | G06N 3/045 |
| 2022/0277741 A1* | 9/2022 | Chaudhary | | G10L 15/22 |
| 2022/0277764 A1* | 9/2022 | Ciliberti | | G10L 15/063 |
| 2022/0300761 A1* | 9/2022 | Zhang | | G06N 3/08 |
| 2022/0309247 A1* | 9/2022 | Jacob | | G06F 40/232 |
| 2022/0310065 A1* | 9/2022 | Rosenberg | | G10L 15/16 |
| 2022/0310084 A1* | 9/2022 | Brdiczka | | G10L 15/22 |
| 2022/0374602 A1* | 11/2022 | Park | | G06F 40/295 |
| 2022/0399116 A1* | 12/2022 | Luethy | | G06N 3/08 |
| 2022/0406415 A1* | 12/2022 | Lambrinoudis | | G06N 3/045 |
| 2023/0004988 A1* | 1/2023 | Bhatt | | G06N 20/00 |
| 2023/0015665 A1* | 1/2023 | Olabiyi | | G06N 20/00 |
| 2023/0025317 A1* | 1/2023 | Miao | | G06F 16/353 |
| 2023/0080553 A1* | 3/2023 | Dharmasiri | | G10L 15/063 |
| | | | | 704/231 |
| 2023/0096821 A1* | 3/2023 | Huang | | G10L 15/197 |
| | | | | 704/235 |
| 2023/0114591 A1* | 4/2023 | Shastry | | G10L 15/04 |
| | | | | 704/235 |
| 2023/0141398 A1* | 5/2023 | Bahdanau | | G06F 40/30 |
| | | | | 704/9 |
| 2023/0153527 A1* | 6/2023 | Puri | | G06F 40/30 |
| | | | | 704/9 |
| 2023/0281394 A1* | 9/2023 | Kuroda | | G06N 20/10 |
| | | | | 704/9 |
| 2023/0326167 A1* | 10/2023 | Mosayyebpour Kaskari | | |
| | | | | G06N 3/084 |
| 2023/0334325 A1* | 10/2023 | Li | | G06V 10/95 |
| 2024/0076744 A1* | 3/2024 | Blidner | | G16B 25/10 |
| 2024/0184997 A1* | 6/2024 | Shou | | G06N 3/08 |

\* cited by examiner

Receive, via a communication interface, a training dataset containing a first utterance associated with a first intent label, wherein the first intent label is selected from a set of pre-defined intent labels 502

Transform the training data into utterance-label pairs by forming an input pair combining the first utterance and the first intent label 504

Generate, for each utterance-label pair, a ground-truth entailment label indicating an entailment relationship between the utterance and the label in the respective pair 506

Generate, using a classifier, a predicted classification label indicating an entailment relationship between the first utterance and the first intent label in response to the input pair 506

Compute a training objective based on a probability distribution of the predicted classification label and the ground-truth label from the transformed training data 510

Update the classifier based on the training objective via backpropagation 512

| | 1-shot | | | 5-shot | | | 10-shot | | |
|---|---|---|---|---|---|---|---|---|---|
| Method | In-Acc[3] | OOS-R[4] | OOS-P[5] | In-Acc | OOS-R | OOS-P | In-Acc | OOS-R | OOS-P |
| CLS-T | 51.56(1.33) | 0.00(0.00) | NA | 87.72(0.64) | 0 | NA | 92.52(0.41) | 0 | NA |
| CLS-T-A | 51.44(1.61) | 0.00(0.00) | NA | 86.78(0.94) | 0 | NA | 91.02(0.18) | 0 | NA |
| CLS-O | 43.41(3.17) | 59.38(1.32) | 48.20(4.82) | 86.79(0.84) | 42.98(2.39) | 80.69(1.49) | 91.98(0.50) | 42.92(1.99) | 95.05(1.01) |
| CLS-O-A | 45.31(2.28) | 55.41(2.23) | 51.03(5.08) | 86.27(1.01) | 43.18(1.81) | 92.84(1.75) | 91.18(0.40) | 36.24(1.21) | 96.87(1.40) |
| DNNC | NA | NA | NA | 88.49(1.00) | 61.46(6.10) | 87.06(3.95) | 91.21(0.61) | 42.6(3.87) | 92.69(1.59) |
| DNNC-A | NA | NA | NA | 85.34(1.36) | 20.30(10.33) | 88.46(4.68) | NA | NA | NA |
| USLP-T | 69.37(1.01) | 62.62(3.07) | 66.92(3.64) | 83.96(1.45) | 65.90(3.58) | 84.32(3.26) | 88.68(0.83) | 70.96(2.78) | 86.27(1.33) |
| USLP-T-A | 71.83(1.13) | 70.14(3.44) | 65.18(5.08) | 85.88(0.58) | 65.47(2.81) | 80.95(5.55) | 90.29(0.44) | 55.42(3.50) | 89.23(2.30) |
| USLP-O | 49.82(2.26) | 92.56(1.35) | 35.09(1.47) | 79.28(1.11) | 67.06(2.34) | 72.61(2.45) | 86.68(0.90) | 56.70(3.81) | 86.48(2.50) |
| USLP-O-A | 66.84(1.05) | 74.3(2.73) | 55.67(3.40) | 85.27(0.60) | 54.18(3.83) | 85.69(1.31) | 90.22(0.59) | 42.34(3.76) | 94.51(1.40) |
| HL-100shot5 | 98.9 | 40.9 | NA | | | | | | |
| HL-100shot6 | 98.2 | 52.3 | NA | | | | | | |

FIG. 7

| | 1-shot | | | 5-shot | | | 10-shot | | |
|---|---|---|---|---|---|---|---|---|---|
| Method | In-Acc | OOS-R | OOS-P | In-Acc | OOS-R | OOS-P | In-Acc | OOS-R | OOS-P |
| Short[1] | 67.76(2.48) | 84.58(3.70) | 58.04(2.54) | 85.54(1.18) | 74.53(6.63) | 89.84(2.33) | 86.66(0.97) | 75.20(2.94) | 89.69(2.28) |
| Short-Aug[1] | 69.68(3.51) | 69.78(4.65) | 80.33(4.34) | 85.54(1.87) | 67.96(5.17) | 84.93(3.06) | 85.46(1.00) | 60.84(5.24) | 84.85(2.27) |
| Long[2] | 76.24(2.47) | 77.2(3.96) | 70.1(5.20) | 88.37(0.54) | 70.71(1.68) | 93.68(2.53) | 88.59(0.61) | 74.80(4.11) | 88.40(2.91) |
| Long-Aug[2] | 74.22(1.14) | 76.09(3.42) | 70.30(3.07) | 83.78(1.68) | 74.08(5.03) | 83.34(2.43) | 87.14(0.83) | 63.82(6.94) | 86.44(2.05) |
| Sym[3] | 4.58(1.02) | 0 | NA | 7.94(1.71) | 0 | NA | 58.90(6.18) | 0 | NA |
| Non-NLI[4] | 64.64(3.74) | 70.51(6.85) | 62.96(1.21) | 82.58(0.98) | 62.08(3.55) | 92.52(1.32) | 88.26(0.51) | 67.16(3.88) | 92.76(1.91) |

FIG. 8

SYSTEMS AND METHODS FOR FEW-SHOT INTENT CLASSIFIER MODELS

CROSS REFERENCE(S)

The instant application is a nonprovisional of and claims priority under 35 U.S.C. § 119 to U.S. provisional application No. 63/189,632, filed May 17, 2021, which is hereby expressly incorporated by reference herein in its entirety.

TECHNICAL FIELD

The present disclosure relates generally to machine learning models and neural networks, and more specifically to the generation of a training dataset configured to train few-shot intent classifiers based on utterance-semantic label entailment relationship.

BACKGROUND

Natural language processing (NLP) models have been used in a variety of real-world applications, such as machine translation, question answering, text classification, etc. In some cases, NLP models often require a large amount of labeled data, and the data annotation alone can be quite costly and labor-intensive. The sheer number of domains and tasks, and ongoing emergences of new ones, have led to the need for additional labelled examples for training the models, posing difficulties the models are scaled to new applications. However, the training for a new task can usually be costly and time-consuming, which inevitably incurs delay to new service rollout. In addition, in some situations, availability of training data for a certain task can be limited.

BRIEF DESCRIPTION OF THE DRAWINGS

FIGS. 7-8 provide example data charts of example performance metrics of the proposed framework shown in FIG. 2, according to some embodiments described herein.

In the figures, elements having the same designations have the same or similar functions.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

As used herein, the term "few-shot" is used to refer to a scenario in training a machine learning system, in which there is limited data samples in the training dataset for a given label. For example, "1-shot" may be used to refer to the scenario that each given label only has one training data sample. And similarly, "5-Shot," "10-shot" may be used to refer to scenarios that even given label has 5 or 10 training data samples.

Artificial intelligence, implemented with neural networks and deep learning models, has demonstrated great promise as a technique for automatically analyzing real-world information with human-like accuracy. In general, such neural network and deep learning models receive input information and make predictions based on the same. Whereas other approaches to analyzing real-world information may involve hard-coded processes, statistical analysis, and/or the like, neural networks learn to make predictions gradually, by a process of trial and error, using a machine learning process. A given neural network model may be trained using a large number of training examples, proceeding iteratively until the neural network model begins to consistently make similar inferences from the training examples that a human might make. Neural network models have been shown to outperform and/or have the potential to outperform other computing techniques in a number of applications.

In practical applications, however, the availability of training examples may be limited due to resource or time constraints. For example, a model that is trained with a set of training examples in one domain may have to learn new labels in a different domain that lacks an adequate set of training examples. In some cases, obtaining labeled datasets for training large models may be expensive or impractical. In such cases, few-shot learning techniques may be utilized to train a model for performing the new tasks. For example, a natural language processing (NLP) model may be trained, using few-shot learning techniques, to perform new intent classification tasks efficiently.

Natural language inference is an NLP task with the goal of determining whether a given statement, referred to as a premise, entails, another given statement, referred to as a hypothesis, i.e., NLI is a task directed to determining the entailment relationship between the premise and the hypothesis. Existing systems have formulated few-shot intent classification as natural language inference between query utterances and examples in the training set. For example, discriminative nearest neighbor classification (DNNC) reformulates few-shot text classification as NLI-style pairwise comparison between training example and query utterance by concatenating a query utterance with a bunch of training examples, and then classifying a relationship between the query utterance and each training example. However, DNNC requires at least two examples per intent for training and has to make M×N (M: number of intents; N: number of training examples per intent) pairwise comparisons for each classification of a query utterance, because each query utterance must be paired with each training example to form an input pair. The enhanced computational complexity renders the system resource inefficient for large-scale applications.

In view of the deficiency of existing systems, some embodiments of the present disclosure disclose an utterance-semantic-label-pair (USLP) framework for utilizing the intent-class-related information included in the semantic labels of utterances in a training dataset. Specifically, the task may be viewed as a textual sequence classification problem where the premise and hypothesis are concatenated as [CLS],premise,[SEP],hypothesis,[SEP] and provided into an NLP model configured to perform intent classification. The [CLS] token denotes class, and [SEP] token denotes separation. By treating an utterance in a training dataset as a premise and semantic labels as hypotheses, any entailment relationship between the utterance and the semantic labels may be classified by a classifier in response to the input sequence concatenating the utterance and the semantic label.

For example, when the classified entailment relationship is positive, a semantic label associated with an utterance in the same utterance-label pair may be assigned as the correct intent label for the utterance. Specifically, an entailment probability score is computed for each utterance-label pair, and the scores of all utterance-label pairs for the same utterance are tanked. In this way, the highest entailment probability score may be identified. If the highest entailment probability score is greater than a threshold, the corresponding utterance-label pair is determined to be an entailed pair, and the corresponding intent label in the pair is determined to be the correct intent label for the utterance. Otherwise, when the classified entailment relationship is negative, a semantic label associated with an utterance in the same utterance-label pair is not assigned as the intent label for the utterance. That is, by utilizing the entailment relationship between utterances and their semantic labels, original training data of query utterances and their semantic intent labels may be transformed into training datasets for classifiers to learn classification of few-shot intent.

Therefore, for a dataset predefined with M intent labels, the pairwise entailment prediction can be reduced to M times per classification, because each incoming query utterance is essentially paired with each of the M intent labels to form an input utterance-label pair to feed into the classifier. This level of computational complexity is greatly reduced from the M×N times prediction per classification of a query utterance in DNNC. In this way, processing complexity is largely reduced and system efficiency can be improved.

Overview

Figure 1:
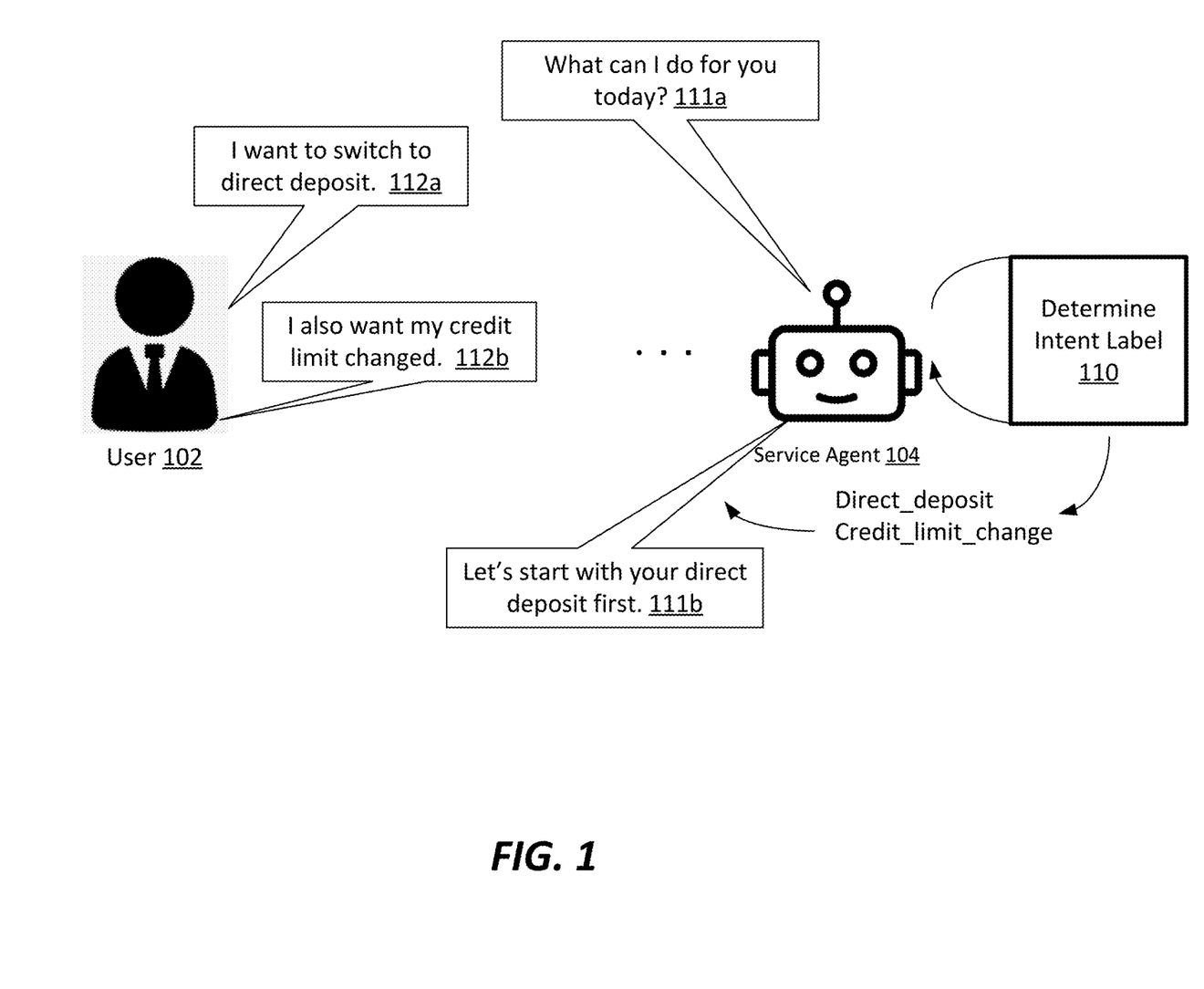
FIG. 1 is a simplified diagram illustrating an example NLP application determining the intent of a user utterance, according to one embodiment described herein.

FIG. 1 is a simplified diagram illustrating an example NLP application determining the intent of a user utterance, according to one embodiment described herein. A user 102 may interact with a service agent 104 via various communication means, such as a verbal communication, a chat online platform, and/or the like. The user 102 may, for example, following a greeting 111a from the service agent 104, articulate several utterances 112a-b that indicate his or her intent to obtain a certain type of service, e.g., "I want to switch to direct deposit," or "I also want my credit limit changed." In response, the service agent 104, upon capturing the user utterances, may often need to determine an intent of the user utterances in order to carry out the next step response or action.

Specifically, the service agent 104 may often need to determine an intent label at 110 for the user utterances 112a-b. For example, an intent label "direct_deposit," or "credit_limit_change" may be determined. The service agent 104 may then generate a response, based on the intent labels, such as "let's start with your direct deposit first" 111b.

Therefore, as shown in FIG. 1, as user 102 continue making new utterances, the ongoing emergences of new utterances may lead to the need for additional labelled examples for training the NLP module at the service agent 104 to generate responses. This training process poses difficulties as to how the models are scaled to new applications. In addition, in some situations, availability of training data for a certain task can be limited. For example, for the intent label "direct_deposit," only a few utterances may be available. Thus, a few-shot classification task is formulated to address the training of the NLP module at the service agent 104, as described in FIG. 2.

Figure 2:
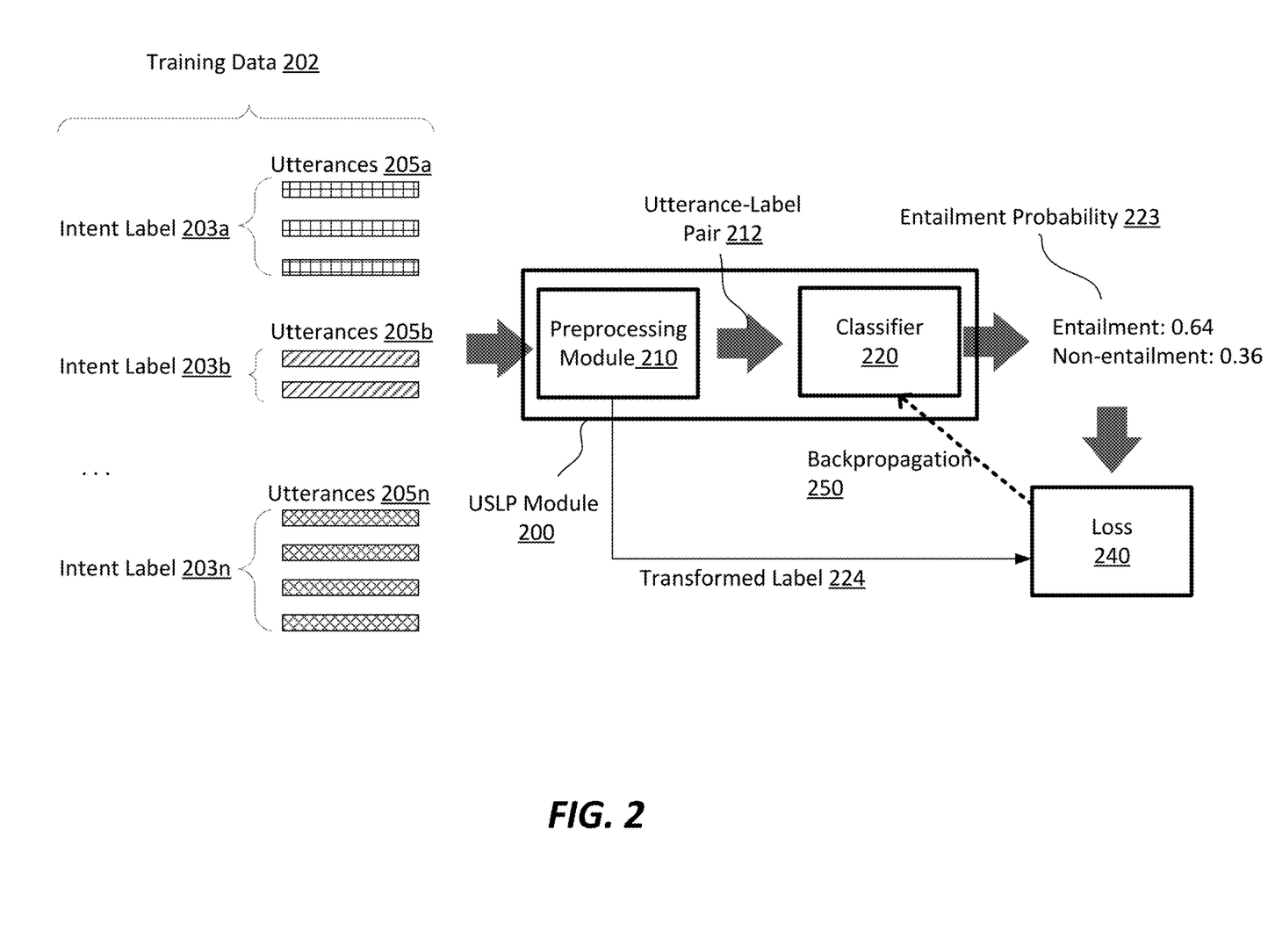
FIG. 2 is a simplified diagram illustrating an utterance-semantic-intent-label pair framework used for training a classifier to generate intent labels which may be implemented by the service agent shown in FIG. 1, according to one embodiment described herein.

FIG. 2 is a simplified diagram illustrating a USLP framework 200 used for training a classifier 220 to generate intent labels which may be implemented by the service agent 104 shown in FIG. 1, according to one embodiment described herein. The USLP module 200 may comprise a data preprocessing module 210 that receives the training data 202, and a classifier 200 that is connected to the preprocessing module 210. The training data 202 may be taken from a dataset of few-shot samples. For example, for each intent label 203a-n, the training data 202 only contains a limited number (e.g., <10, <20, etc.) of samples 205a-n corresponding to each intent label 203a-n.

The data preprocessing module 210 may generate utterance-label pairs 212 from the training data 202. For example, utterances 205a-n in training data 202 are treated as premise while semantic labels 203-n are considered as hypothesis. Each utterance (any of 205a-n) is paired with an intent label, either the intent label associated with the respective utterance, or an intent label that does not associated with the respective utterance. For example, each utterance may be paired with each pre-defined intent label 203a-n to form a maximum of M utterance-label pairs, where M is the total number of intent classes.

The preprocessing module 210 may also generate transformed entailment labels 224 accompanying the utterance-label pairs 212. The entailment label of an utterance-label pair indicates an entailment relationship between an utterance (premise) and an intent label (hypothesis) in an utterance-label pair. For example, the relationship can be binary, e.g., entailment or non-entailment, or ternary (e.g., entailment, contradiction, and neutral). For binary entailment labels, an utterance-label pair is treated as a positive or entailment example if the label is the assigned intent for the utterance. Similarly, if the label is not the right intent label for the utterance in the same utterance-label pair, the pair is considered as a negative or non-entailment example. For ternary entailment labels, an utterance-label pair is treated as a positive or entailment example if the label is the assigned intent for the utterance. The pair is considered as contradictive if the utterance contradicts the intent label. Or the pair is considered as neutral if the utterance is neither positive nor contradicting to the intent label, e.g., irrelevant.

The formed utterance-label pairs 212 are then passed to the classifier 220 to generate an entailment probability distribution 223. For example, for binary entailment label, the probability distribution among the entailment or non-entailment may be predicted as shown in FIG. 2. Or alternatively, for ternary labels, the probability distribution among entailment, contradiction, and neutral may be predicted.

In this way, the NLI task that infers the relationship between the premise and hypothesis is treated as a textual sequence classification problem, where the premise and hypothesis sentences are concatenated as [CLS]; premise; [SEP]; hypothesis; [SEP] (depending on the tokenizer, the concatenated text might be slightly different) and fed into the classifier 220). The last hidden state of the [CLS] token is commonly used for classification.

A loss module 240 may then receive the predicted entailment probability 223, and compared with the transformed label 224 to compute a loss objective, e.g., binary cross-entropy, etc. The computed loss objective may then be used to update the classifier 220 via backpropagation path 250. It is noted that the loss module 240 is shown as an independent module in FIG. 2 for illustrative purpose only. The loss module 240 may be a software and/or hardware module integrated with the USLP module 200.

Figure 3:
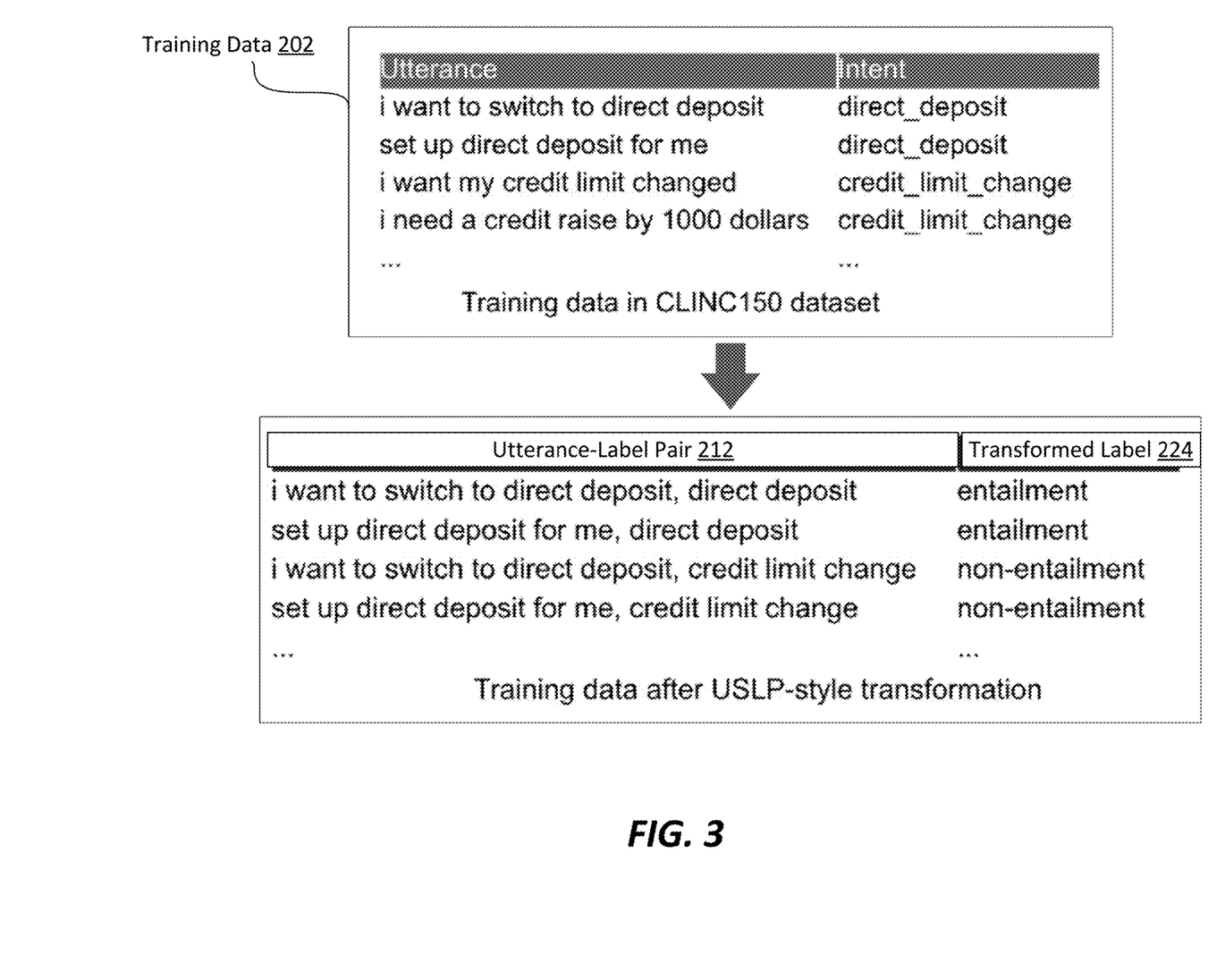
FIG. 3 is a simplified diagram illustrating an example of transforming training data into utterance-label pairs, according to one embodiment described herein.

FIG. 3 is a simplified diagram illustrating an example of transforming training data into utterance-label pairs, according to one embodiment described herein. For example, the training data 202 may contain utterances such as "I want to switch to direct deposit" with an intent label "direct_deposit," or "I want my credit limit changed" with an intent label "credit_limit_change," and/or the like.

Example utterance-label pairs 212 may be formed by concatenating the utterance and an intent label, and then a transformed label 224 indicating whether the utterance entails the intent label. For example, for the pair "I want to switch to direct deposit, direct deposit," the transformed label is "entailment" indicating that the utterance "I want to switch to direct deposit" entails the label "direct deposit." However, for the pair "I want to switch to direct deposit, credit limit change," the transformed label is "non-entailment" indicating that the utterance "I want to switch to direct deposit" does not correspond to the intent label "credit limit change."

It is worth noting that the USLP method does not necessarily require intent labels to have semantic meaning. However, detailed and semantically meaningful labels can benefit in-domain classification.

Computer Environment

Figure 4:
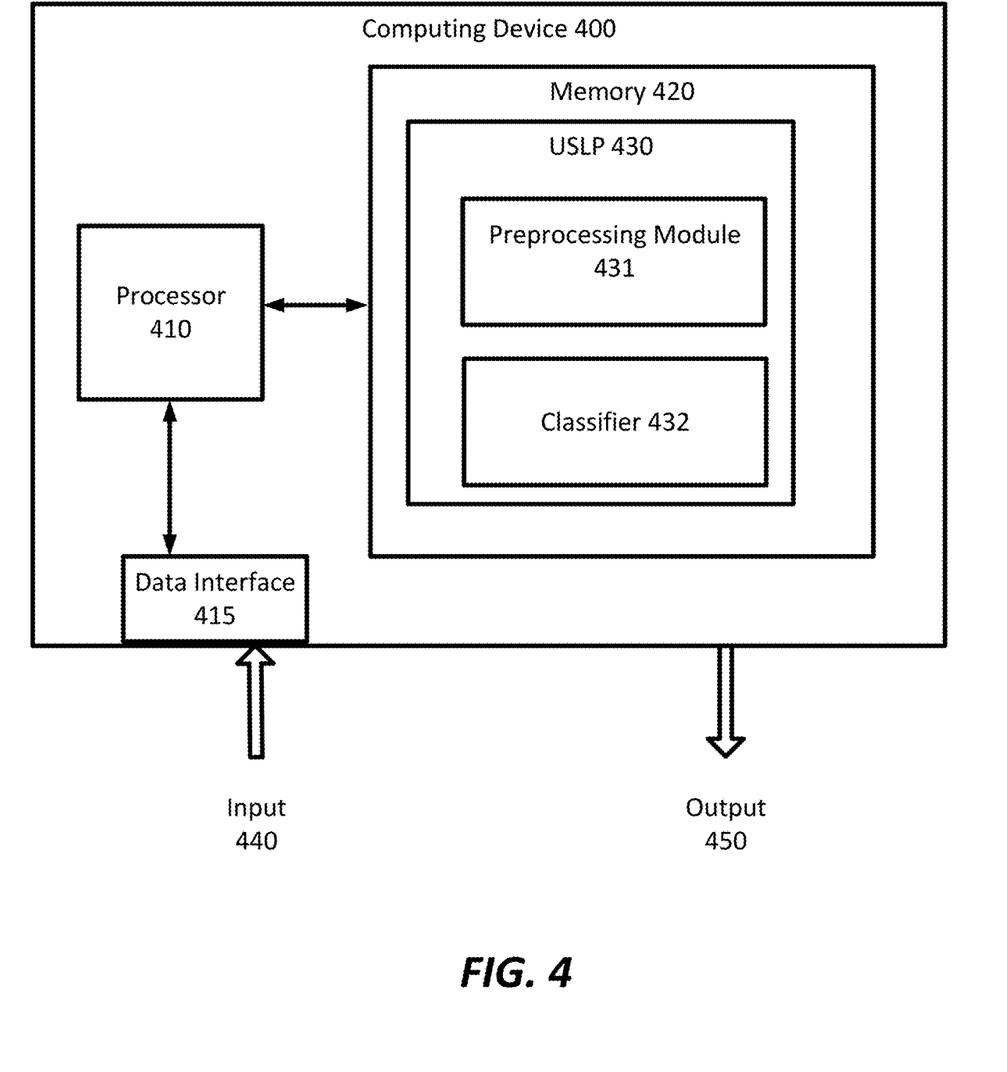
FIG. 4 is a simplified diagram of a computing device implementing the framework in FIG. 2, according to some embodiments.

FIG. 4 is a simplified diagram of a computing device 400 implementing USLP according to some embodiments. As shown in FIG. 4, computing device 400 includes a processor 410 coupled to memory 420. Operation of computing device 400 is controlled by processor 410. And although computing device 400 is shown with only one processor 410, it is understood that processor 410 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 400. Computing device 400 may be implemented as a stand-alone subsystem, as a board added to a computing device, and/or as a virtual machine.

Memory 420 may be used to store software executed by computing device 400 and/or one or more data structures used during operation of computing device 400. Memory 420 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 410 and/or memory 420 may be arranged in any suitable physical arrangement. In some embodiments, processor 410 and/or memory 420 may be implemented on a same board, in a same package (e.g., system-in-package), on a same chip (e.g., system-on-chip), and/or the like. In some embodiments, processor 410 and/or memory 420 may include distributed, virtualized, and/or containerized computing resources. Consistent with such embodiments, processor 410 and/or memory 420 may be located in one or more data centers and/or cloud computing facilities.

As shown, memory 420 includes a USLP module 430 (which performs similar functionality as the USLP module 200 in FIG. 2) that may be used to implement and/or emulate the neural network systems and models described further herein and/or to implement any of the methods described further herein, such as but not limited to the framework described with reference to FIG. 2. The USLP module 430 may be used, in some examples, for generating a training dataset configured to train few-shot intent classifiers based on entailment relationship between utterances and their semantic labels. In one embodiment, the USLP module 430 includes a preprocessing module 431 (similar to the preprocessing module 210 in FIG. 2) and a classifier 432 (similar to the classifier 220 in FIG. 2).

In some examples, memory 420 may include non-transitory, tangible, machine readable media that include executable code that when run by one or more processors (e.g., processor 410) may cause the one or more processors to perform the methods described in further detail herein. In some examples, USLP module 430 and its submodules 431-432 may be implemented using hardware, software, and/or a combination of hardware and software. As shown, computing device 400 receives input 440, which is provided to USLP module 430, which then may generate output 450.

In some examples, the USLP module 430, may receive an input 440, e.g., such as an utterance accompanying an intent label, via a data interface 415. The data interface 415 may be any of a user interface that receives a user utterance articulated or entered by a user, or a communication interface that may receive or retrieve training data comprising user utterances and intent labels from the database. The USLP module 430 may generate an output 450, such as an entailment label indicating whether the utterance and the intent label in the input 440 has an entailment relationship.

In some embodiments, the input 440 may include a training dataset including utterances and semantic labels labeling the utterances. In some instances, the intent labels may have additional label descriptions. In some instances, the training dataset may be small in that the neural network model in the USLP module 430 trained with the training dataset, based on the entailment relationship between the utterances and the semantic labels as discussed in the present disclosure, may be configured to perform few-shot classification tasks. In some embodiments, the output 450 can include the training dataset that is configured for training a neural network model to perform few-shot intent classification. Further, the output 450 may include a neural network model that is configured to perform intent classification with small amount of training dataset.

Workflows

Figure 5:
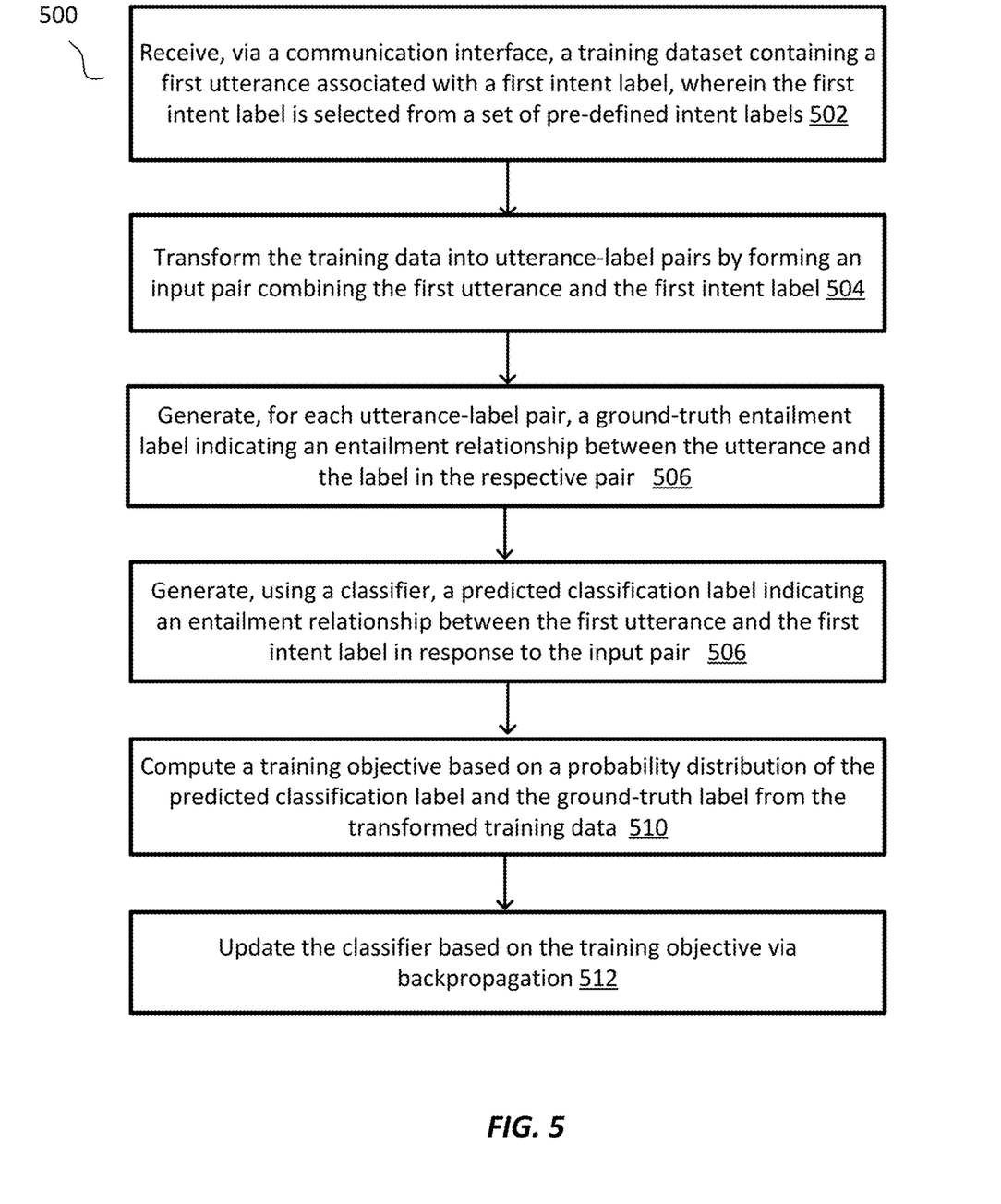
FIG. 5 is a simplified diagram of a method for training a classifier for few-shot intent classification of an input natural language utterance, according to some embodiments.

FIG. 5 is a simplified diagram of a method 500 for training a classifier for few-shot intent classification of an input natural language utterance, according to some embodiments. One or more of the processes of method 500 may be implemented, at least in part, in the form of executable code stored on non-transitory, tangible, machine-readable media that when run by one or more processors may cause the one or more processors to perform one or more of the processes. In some embodiments, method 500 corresponds to the operation of intent classification module 430 (FIG. 4) to perform the task of generating neural network configured to perform few-shot classification task, and a training dataset configured to train such a neural network.

At step 502, a training dataset (e.g., training data 202 in FIG. 2) containing a first utterance (e.g., any of utterances 205a-n in FIG. 2) associated with a first intent label (e.g., intent labels 203a-n in FIG. 2) may be received via a communication interface (e.g., 415 in FIG. 4). The first intent label is selected from a set of pre-defined intent labels may be received. The training dataset may be a few-shot dataset containing less than a pre-defined number of utterances corresponding to the first intent label.

At step 504, the training data may be transformed into utterance-label pairs (e.g., 212 in FIG. 2) at least by forming an input pair combining the first utterance and the first intent label. For example, a ground-truth entailment label may be generated for each utterance-label pair depending on whether a respective utterance and a respective intent label in the respective utterance-label match with each other. The input pair is formed by concatenating the first utterance and the first intent label separated by a special token.

At step 506, a classifier (e.g., classifier 220 in FIG. 2) may generate a predicted classification label indicating an entailment relationship between the first utterance and the first intent label in response to the input pair. For example, the predicted classification label is selected from a group of a first label indicating the first intent label entails the first utterance, a second label indicating that the first intent label contradicts the first utterance, and a third label indicating that the first intent label is irrelevant to the first utterance.

In one implementation, the predicted classification label is a binary label indicating whether the first intent label entails the first utterance.

In one implementation, the predicted classification label is generated in a form of a probability distribution indicating a likelihood that the input pair corresponds to the predicted classification label.

At step 508, a training objective may be computed based on the predicted classification label. The predicted classification label is generated in a form of a probability distribution indicating a likelihood that the input pair corresponds to the predicted classification label. For example, the training objective is computed as a binary cross-entropy between the probability distribution and a binary ground-truth label derived from the first intent label from the training dataset.

At step 510, the classifier may be updated based on the training objective via backpropagation (e.g., see backpropagation path 224 in FIG. 2).

Figure 6:
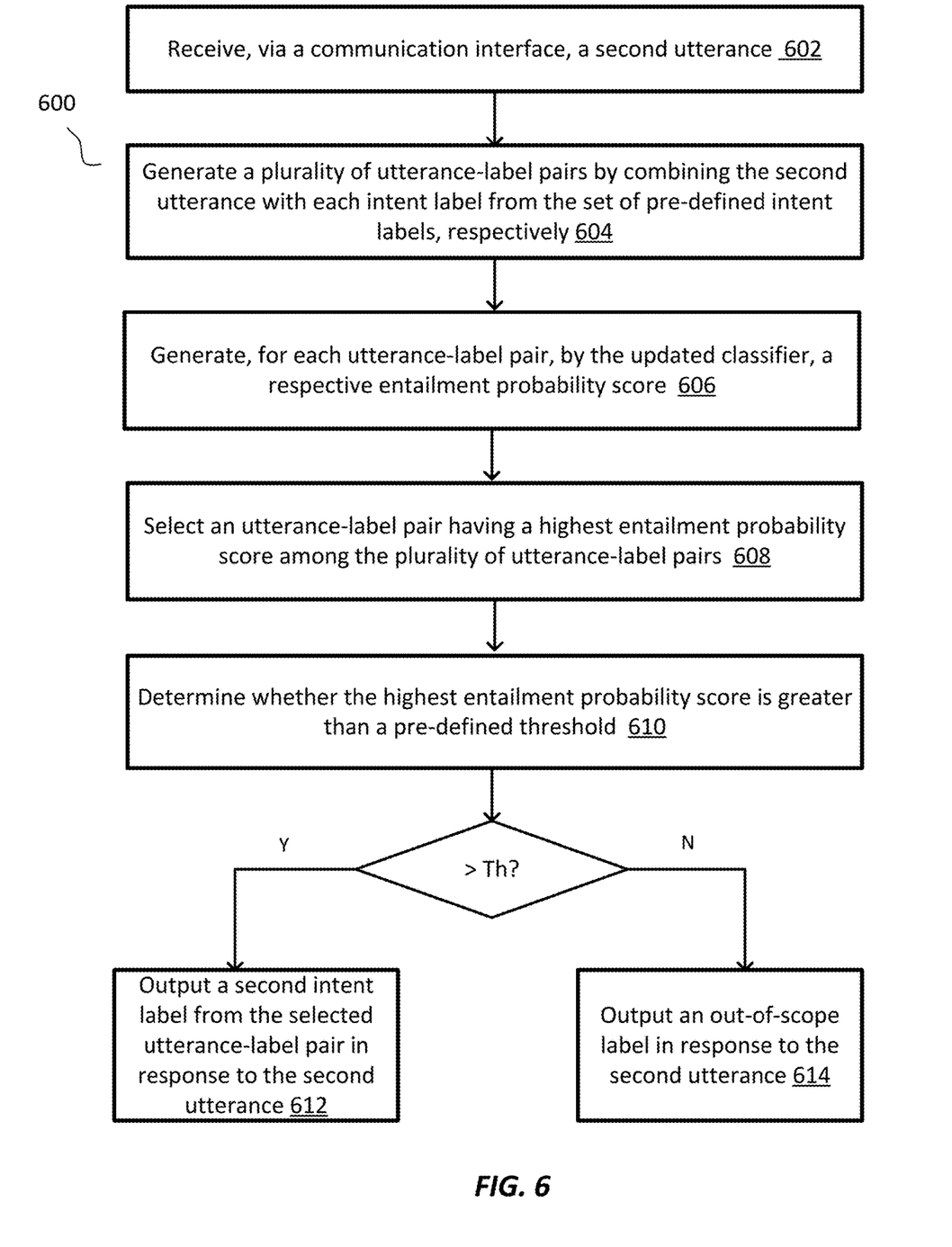
FIG. 6 is a simplified diagram of a method for few-shot intent classification of an input natural language utterance, according to some embodiments.

FIG. 6 is a simplified diagram of a method 600 for few-shot intent classification of an input natural language utterance, according to some embodiments. One or more of the processes of method 600 may be implemented, at least in part, in the form of executable code stored on non-transitory, tangible, machine-readable media that when run by one or more processors may cause the one or more processors to perform one or more of the processes. In some embodiments, method 600 corresponds to the operation of intent classification module 430 (FIG. 4) to perform the task of generating neural network configured to perform few-shot classification task, and a training dataset configured to train such a neural network.

At step 602, a second utterance may be received from a communication interface (e.g., 415 in FIG. 4). For example, a user may articulate via a voice input interface, or may enter through a user interface, the utterance.

At step 604, a plurality of utterance-label pairs may be generated by combining the second utterance with each intent label from the set of pre-defined intent labels, respectively.

At step 606, for each utterance-label pair, the trained classifier may generate a respective entailment probability score.

At step 608, an utterance-label pair having a highest entailment probability score may be selected among the plurality of utterance-label pairs.

At step 610, it is determined whether the highest entailment probability score is greater than a pre-defined threshold. For example, if the highest entailment probability score is greater than a pre-defined threshold, the second intent label associated with the second utterance in the selected utterance-label pair may be outputted from the selected utterance-label pair in response to the second utterance at step 612.

For instance, in the example shown at 223 in FIG. 2, when the entailment probability is 0.64 for an utterance-label pair "I want to switch to direct deposit, direct_deposit" and the threshold is 0.5, it is determined that the entailment probability is greater than the threshold. Therefore, the utterance "I want to switch to direct deposit" entails the label "direct_deposit." The corresponding intent label of the utterance "I want to switch to direct deposit" is then output as "direct_deposit."

Or if the highest entailment probability score is no greater than a pre-defined threshold an out-of-scope label may be outputted in response to the second utterance at step 614. For instance, in the above example, if the pre-defined threshold is set as 0.7, then the entailment probability 0.64 for an utterance-label pair "I want to switch to direct deposit, direct_deposit" is lower than the threshold. In this case, an out-of-scope label is outputted for the utterance "I want to switch to direct deposit."

In one implementation, to accommodate out-of-scope (OOS) prediction, the out-of-scope class may be treated as an additional intent class like the other intent labels.

Example Performance

In one embodiment, to make good use of transformer model on NLI task, the data processing and training pipeline provided by Zhang et al., Discriminative nearest neighbor few-shot intent detection by transferring natural language inference, in Proceedings of the 2020 Conference on Empirical Methods in Natural Language Processing (EMNLP), pages 5064-5082, 2020, is used to combine three NLI corpus (SNLI (described in Bowman et al., A large annotated corpus for learning natural language inference. In Proceedings of the 2015 Conference on EMNLP, pages 632-642, 2015), MNLI (Williams et al., A broad-coverage challenge corpus for sentence understanding through inference, in Proceedings of the 2018 Conference of the North American Chapter of the Association for Computational Linguistics: Human Language Technologies, Volume 1 (Long Papers), pages 1112-1122, 2018), and WNLI (described in the Levesque—the Winograd Schema Challenge, 2011) from the GLUE benchmark (Wang et al., GLUE: A multi-task benchmark and analysis plat-form for natural language understanding, in Proceedings of the 2018 EMNLP Workshop Blackbox NLP: Analyzing and Interpreting Neural Net-works for NLP, pages 353-355, 2018) and use them for NLI pre-training.

The training dataset includes CLINC150 and SGD. CLINC150, which is introduced by Larson et al., An evaluation dataset for intent classification and out-of-scope prediction. In Proceedings of the 2019 Conference on Empirical Methods in Natural Language Processing and the 9th International Joint Conference on Natural Language Processing (EMNLP-IJCNLP), 2019, is a multi-domain dataset for intent classification task. It has three dataset variants for in-domain and out-of-scope (OOS). A small dataset is used, which contains 150 intents, 50 examples/intent and 100 OOS examples for training. The original labeling has hyphen between each token in the label, hyphen is replaced with empty space to format the la-bel as short phrase. To simulate 1-, 5-, and 10-shot experiment, examples are randomly drawn from the small dataset. Each experiment is run five times with different seeds to capture the variations in random samplings. Dev set is removed to simulate real few-shot scenario and use the original testing set for final results.

The "Schema-Guided Dialogue Dataset" (SGD) is a dataset about task-oriented dialogue. Its intent labels have detailed description, which is effective for evaluating if detailed semantic labeling can help improve model performance. Since the original SGD dataset is not designed for few-shot intent classification, a few data processing steps are performed to customize the dataset for our use case.

For example, utterances, intents, and detailed intent descriptions are first extracted from the training set. The original labels formatted as tokens been concatenated together with the first letter capitalized, an empty space is introduced between each token. In the original dataset, the label set of the testing set does not fully overlap with the training set, so the utterances are kept with overlapped intents (25 intents) for in-domain and use the utterances with non-overlapped intents for OOS training (11 intents). As the goal of using the SGD dataset is to explore how different labeling techniques might impact final results, the same training set is used to exclude the confounding factor of random training data sampling, so 1-, 5-, 10-shot are sampled in-domain and 110 OOS (10 utterances/non-overlapped intent) utterances from the processed training set for all the SGD experiments. The original testing set has 11,105 utterances, which is expensive to run through for evaluation. So, 50 utterances per overlapped intents are sampled for in-domain testing set and 50 utterances per non-overlapped intents (9 non-overlapped intents) for OOS testing set, resulting in a testing set with 1,250 in-domain and 450 OOS utterances. For example, the data preprocessing may result in a subset of SGD dataset with 25 intents and 110 OOS utterances.

The nlpaug library (described in Ma, 2019) is used for token-level data augmentation. In-domain utterances are augmented 4 times using random insertion, cBERT-based substitution, random swapping, and synonym replacement API.

The transformer library (Wolf et al., Transformers: State-of-the-art natural language processing, in Proceedings of the 2020 Conference on Empirical Methods in Natural Language Processing: System Demonstrations, pages 38-45, 2020) may be used for modeling. In NLI pre-training, the pre-trained Roberta-base model may be adopted. For downstream few-shot training, AdamW optimizer and linear scheduler, learning rate as 5e−5, epochs as 100, and train batch size as 128. This hyper-parameter set is learnt to be effective from previous experiments with in-house dataset. To simulate a real few shot setting, where dev set is often unavailable for hyper-parameter tuning and to demonstrate that the proposed method can be easily generalized into different datasets, all the dev sets may be disregarded and simply use the same hyper-parameter set without any further hyper-parameter tuning.

Since the NLI reformulation of text classification results in much more negative examples than positive ones, equal number of positive and negative examples are sampled for every batch to keep the model been exposed the balanced training examples. Furthermore, to prevent overfitting, each epoch iterates through all the positive examples while the negative examples are randomly sampled to form batches with positive examples. This data sampling strategy leads to better performance based upon previous empirical results on other in-house datasets. The previous DNNC work doesn't enforce balanced sampling, the positive and negative examples are mixed together and sampled randomly.

As shown in FIGS. 7-8, USLP outperforms other methods by a large margin in 1-shot setting. Results from FIG. 7 show that USLP-T-A outperforms traditional classification approach by 20, 10, and 15 points in terms of in-domain accuracy, OOS recall, and OOS precision. The DNNC approach requires more than 1 ex-ample per class to start with, so it is out of the comparison. Compared with the 100-shot BERT-large results reported in Larson et al., the USLP-T-A achieves about 75% of the in-domain performance and has significantly higher OOS-recall score. Noticeably, within different USLP methods, the USLP-T has much better performance for in-domain accuracy (~20 points) and OOS-precision (>30 points) than USLP-O, but the USLP-O outperforms USLP-T by around 30 points for OOS-recall. One potential reason is the extremely unbalanced data; there are only one example per in-domain class, and in total there are 150 in-domain examples, but 100 examples for OOS. The USLP-O treats OOS as an extra class, but the OOS class has overwhelmingly more examples than other classes do, which could make the model favor OOS prediction. USLP-T approach, however, uses threshold to control in-domain and OOS prediction. The experiments use 0.01 as the threshold, which tend to favor in-domain predictions and alleviates the extreme unbalance issue. Data augmentation can help im-prove in-domain classification and OOS-precision, but its impacts on OOS-recall and OOS-precision are opposite for USLP-T-A and USLP-O-A.

As more in-domain data is added, in 5-shot and 10-shot experiments, the traditional classifier and DNNC in general perform better than USLP in terms of in-domain classification, but USLP has better and more balanced OOS-recall and OOS-precision scores. For example, in 10-shot experiments, CLS-T has the best in-domain accuracy, but it is unable to make OOS detection; DNNC has slightly better in-domain and OOS-precision result than USLP, but its OOS-recall is below that of USLP-T by around 30 points. Data augmentation seems to be more effective with USLP; it tends to hurt CLS and DNNC performance.

SGD dataset is used to further study how relevant factors like labeling technique, data augmentation, and NLI pre-training on general corpus might impact USLP-T performance in different few-shot settings. Results are shown in FIG. 8.

Descriptive labeling can help improve USLP in-domain accuracy and OOS-precision. The SGD dataset provides intent labels as well as detailed descriptions for each label. To figure out the role of different labeling techniques in USLP-based intent classification, three experiments are shown with different labeling, 1) short labels, which are simply the original intent label. They are composed of either single words or short phrases and have limited semantic meaning; 2) long labels, which is the label description. Each description is usually a longer sentence than short labels and therefore can carry more semantic information; 3) symbolic labels. Labels are converted into symbols like "0" and "1", which carry no semantic information. The results in FIG. 8 show that, long labels can effectively improve model performance. Especially at extreme low-resource scenario (1-shot), the long labels boost both in-domain accuracy and OOS-precision by 8+ points. Interestingly, long labels hurt model performance on OOS-recall.

NLI pre-training can boost performance in low-shot setting, but might have adverse effect when more training data is available. The original hypothesis is that by exposing transformer model to NLI pre-training, the model can be more adapted into NLI related tasks and achieves better performance compared with the model without NLI pre-training. In 1-shot and 5-shot setting, it is observed that NLI pre-trained model can improve in-domain accuracy and OOS recall. But in 10-shot experiments, the NLI pre-trained model has weaker performance in terms of in-domain accuracy and OOS-precision.

Some examples of computing devices, such as computing device 400 may include non-transitory, tangible, machine readable media that include executable code that when run by one or more processors (e.g., processor 410) may cause the one or more processors to perform the processes of method 400. Some common forms of machine-readable media that may include the processes of method 400 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed:

1. A method for few-shot intent classification of an input natural language utterance, the method comprising:
   receiving, via a communication interface, a training dataset containing a plurality of utterances and a plurality of pre-defined intent labels;
   transforming the training dataset into a plurality of utterance-label pairs by pairing an utterance of the plurality of utterances with each of the plurality pre-defined intent labels, wherein each of the plurality of utterance-label pairs includes the utterance and a pre-defined intent label of the plurality of pre-defined intent labels;
   generating a transformed entailment label for each of the plurality of utterance-label pairs, wherein the transformed entailment label indicates an entailment relationship between the utterance and the pre-defined intent label in an utterance-label pair;
   inputting the plurality of utterance-label pairs to a classifier;
   generating, using the classifier, an entailment probability distribution for each of the plurality of utterance-label pairs;
   comparing the entailment probability distribution with the corresponding transformed entailment label for each of the plurality utterance-label pair;
   computing a training objective based on the comparison of the entailment probability distribution with the corresponding transformed entailment label for each of the plurality of utterance-label pair; and
   updating the classifier based on the training objective via backpropagation.

2. The method of claim 1, wherein the training dataset contains less than a pre-defined number of utterances corresponding to the pre-defined intent label.

3. The method of claim 1, wherein the entailment probability distribution indicates the probability a respective utterance and a respective pre-defined intent label in a respective input utterance-label pair match with each other.

4. The method of claim 1, wherein the input utterance-label pair is formed by concatenating the utterance and the pre-defined intent label separated by a special token.

5. The method of claim 1, wherein the transformed entailment label is selected from a group of a first label indicating the pre-defined intent label entails the first utterance, a second label indicating that the pre-defined intent label contradicts the utterance, and a third label indicating that the pre-defined intent label is irrelevant to the utterance.

6. The method of claim 1, wherein the transformed entailment label is a binary label indicating whether the pre-defined intent label entails the utterance.

7. The method of claim 1, wherein the transformed entailment label is generated in a form of an entailment probability distribution indicating a likelihood that the input utterance-label pair corresponds to the transformed entailment label.

8. The method of claim 7, wherein the training objective is computed as a binary cross-entropy between the entailment probability distribution and a binary ground-truth label derived from the pre-defined intent label from the training dataset.

9. The method of claim 1, further comprising:
   receiving, via the communication interface, another utterance;

generating a plurality of utterance-label pairs by combining the other utterance with each of the pre-defined intent labels, respectively;
generating, for each utterance-label pair, by the updated classifier, a respective entailment probability distribution score; and
selecting an utterance-label pair having a highest entailment probability distribution score among the plurality of utterance-label pairs.

10. The method of claim 9, further comprising:
determining whether the highest entailment probability distribution score is greater than a pre-defined threshold;
outputting another intent from the selected utterance-label pair in response to the other utterance when the highest entailment probability distribution score is greater than the pre-defined threshold; and
outputting an out-of-scope label in response to the other utterance when the highest entailment probability distribution score is no greater than the pre-defined threshold.

11. A system for few-shot intent classification of an input natural language utterance, the system comprising:
a communication interface receiving a training dataset containing a plurality of utterances and a plurality of pre-defined intent labels;
a memory storing a plurality of processor-executable instructions; and
a processor reading from the memory and executing the instructions to perform operations comprising:
transforming the training dataset into a plurality of utterance-label pairs by pairing an utterance of the plurality of utterances with each of the plurality pre-defined intent labels, wherein each of the plurality of utterance-label pairs includes the utterance and a pre-defined intent label of the plurality of pre-defined intent labels;
generating a transformed entailment label for each of the plurality of utterance-label pairs, wherein the transformed entailment label indicates an entailment relationship between the utterance and the pre-defined intent label in an utterance-label pair;
inputting the plurality of utterance-label pairs to a classifier;
generating, using the classifier, an entailment probability distribution for each of the plurality of utterance-label pairs;
comparing the entailment probability distribution with the corresponding transformed entailment label for each of the plurality utterance-label pair;
computing a training objective based on the comparison of the entailment probability distribution with the corresponding transformed entailment label for each of the plurality of utterance-label pair; and
updating the classifier based on the training objective via backpropagation.

12. The system of claim 11, wherein the training dataset contains less than a pre-defined number of utterances corresponding to the pre-defined intent label.

13. The system of claim 11, wherein the entailment probability distribution indicates the probability a respective utterance and a respective pre-defined intent label in a respective input utterance-label pair match with each other.

14. The system of claim 11, wherein the input utterance-label pair is formed by concatenating the utterance and the pre-defined intent label separated by a special token.

15. The system of claim 11, wherein the transformed entailment label is selected from a group of a first label indicating the pre-defined intent label entails the utterance, a second label indicating that the pre-defined intent label contradicts the utterance, and a third label indicating that the pre-defined intent label is irrelevant to the utterance.

16. The system of claim 11, wherein the transformed entailment label is a binary label indicating whether the pre-defined intent label entails the utterance.

17. The system of claim 11, wherein the transformed entailment label is generated in a form of an entailment probability distribution indicating a likelihood that the input utterance-label pair corresponds to the transformed entailment label.

18. The system of claim 17, wherein the training objective is computed as a binary cross-entropy between the entailment probability distribution and a binary ground-truth label derived from the pre-defined intent label from the training dataset.

19. The system of claim 11, further comprising:
receiving, via the communication interface, another utterance;
generating a plurality of utterance-label pairs by combining the other utterance with each of the pre-defined intent labels, respectively;
generating, for each utterance-label pair, by the updated classifier, a respective entailment probability distribution score; and
selecting an utterance-label pair having a highest entailment probability distribution score among the plurality of utterance-label pairs;
determining whether the highest entailment probability distribution score is greater than a pre-defined threshold;
outputting another intent from the selected utterance-label pair in response to the other utterance when the highest entailment probability distribution score is greater than the pre-defined threshold; and
outputting an out-of-scope label in response to the other utterance when the highest entailment probability distribution score is no greater than the pre-defined threshold.

20. A non-transitory processor-readable storage medium storing a plurality of processor-executable instructions for few-shot intent classification of an input natural language utterance, the instructions being executed by a processor to perform operations comprising:
receiving, via a communication interface, a training dataset containing a plurality of utterances and a plurality of pre-defined intent labels;
transforming the training dataset into a plurality of utterance-label pairs by pairing an utterance of the plurality of utterances with each of the plurality pre-defined intent labels, wherein each of the plurality of utterance-label pairs includes the utterance and a pre-defined intent label of the plurality of pre-defined intent labels;
generating a transformed entailment label for each of the plurality of utterance-label pairs, wherein the transformed entailment label indicates an entailment relationship between the utterance and the pre-defined intent label in an utterance-label pair;
inputting the plurality of utterance-label pairs to a classifier;
generating, using the classifier, an entailment probability distribution for each of the plurality of utterance-label pairs;

comparing the entailment probability distribution with the corresponding transformed entailment label for each of the plurality utterance-label pair;

computing a training objective based on the comparison of the entailment probability distribution with the corresponding generated transformed entailment label for each of utterance-label pair; and updating the classifier based on the training objective via backpropagation.

* * * * *

UNITED STATES PATENT AND TRADEMARK OFFICE
CERTIFICATE OF CORRECTION

PATENT NO. : 12,340,792 B2
APPLICATION NO. : 17/534008
DATED : June 24, 2025
INVENTOR(S) : Jin Qu et al.

Page 1 of 1

It is certified that error appears in the above-identified patent and that said Letters Patent is hereby corrected as shown below:

On the Title Page

Item [71], change:
"Salesforce, Inc"

To:
--Salesforce, Inc.--

In the Claims

Claim 5, Column 12, Lines 46-51, change:
"5. The method of claim 1, wherein the transformed entailment label is selected from a group of a first label indicating the pre-defined intent label entails the first utterance, a second label indicating that the pre-defined intent label contradicts the utterance, and a third label indicating that the pre-defined intent label is irrelevant to the utterance."

To:
--5. The method of claim 1, wherein the transformed entailment label is selected from a group of a first label indicating the pre-defined intent label entails the utterance, a second label indicating that the pre-defined intent label contradicts the utterance, and a third label indicating that the pre-defined intent label is irrelevant to the utterance.--

Signed and Sealed this
Twenty-sixth Day of August, 2025

Coke Morgan Stewart
*Acting Director of the United States Patent and Trademark Office*